Jan. 14, 1930.  L. R. HURLBURT  1,743,780
APPARATUS FOR PACKING ARTICLES IN CANS
Filed May 15, 1928   2 Sheets-Sheet 2
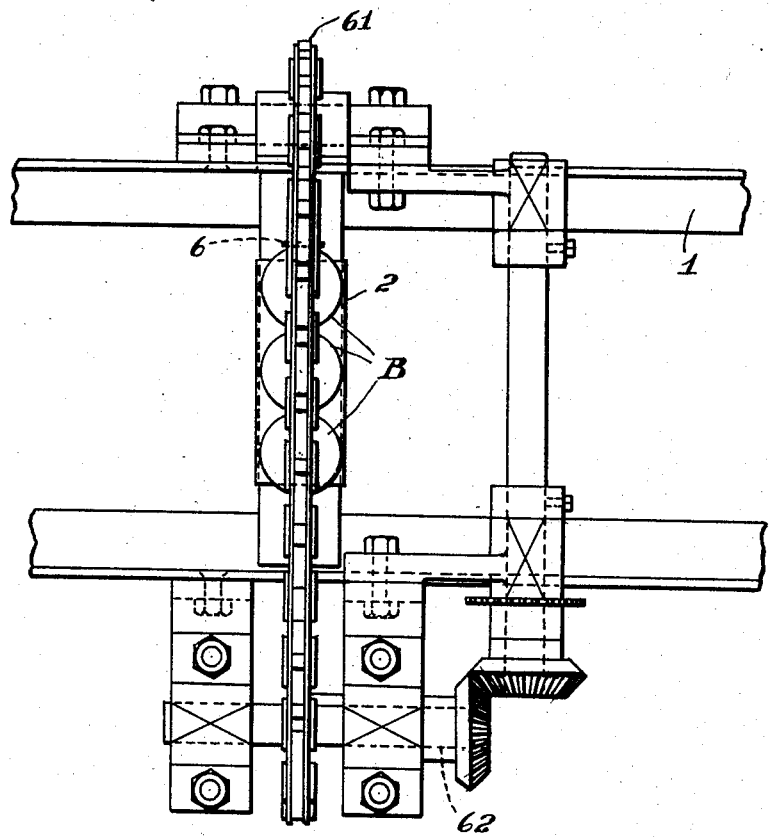

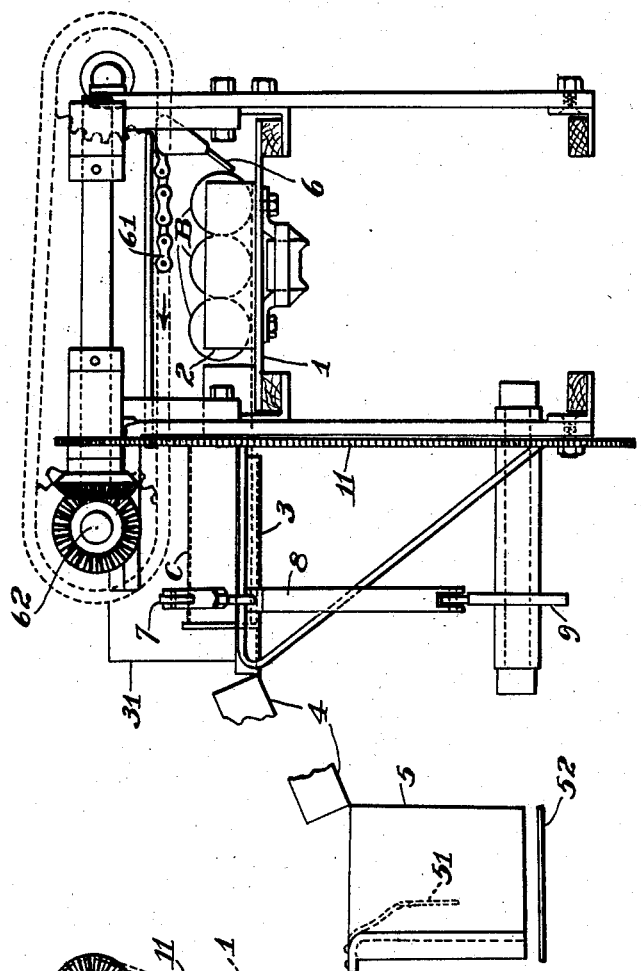

Patented Jan. 14, 1930

1,743,780

UNITED STATES PATENT OFFICE

LEE R. HURLBURT, OF FLUSHING, NEW YORK, ASSIGNOR TO PENNSYLVANIA RUBBER COMPANY, OF JEANNETTE, PENNSYLVANIA, A CORPORATION OF PENNSYLVANIA

APPARATUS FOR PACKING ARTICLES IN CANS

Application filed May 15, 1928. Serial No. 277,846.

By invention relates to improvements in apparatus for packing articles in cans. It finds particular application in canning tennis balls. Tennis balls are thin-walled spheres, formed essentially of rubber and filled with air or other gas under pressure. Because the materials are some of them chemically unstable, and because the walls of the balls are not ordinarily perfectly impenetrable, it has been found expedient to pack balls for shipment in hermetically sealed containers. These containers may or may not contain, exterior to the balls, air or other gas at elevated pressure. Tennis balls commonly are used in sets of three, and it is desirable to can them in sets of three. The cans conveniently are elongate cylinders, of diameter sufficient to admit the entrance of a single ball, with no more than sufficient clearance, and of a length approximately three times the diameter.

In the accompanying drawings a canning machine of my invention is illustrated. Fig. I is a view of the machine in side elevation; Fig. II, a view in end elevation; and Fig. III, a view in plan from above. From the showing of Fig. III certain of the associate parts, appearing in Fig. I, are absent.

A conveyor 1 equipped with transversely extending, open ended troughs 2 brings the balls B in groups of three to the canning apparatus. The canning apparatus includes a support 3, a chute 4, and a guide 5 provided with an elastic tongue 51 for bringing the advancing cans one by one to upright position upon a moving plate 52.

The support 3 is adapted to receive and sustain a can C in position, its open mouth toward the conveyor, aligned with a trough 2, when as the conveyor advances the trough comes to the position shown in the drawings. The support, while so sustaining a can, allows the can to be moved longitudinally upon it. The can lies upon the support, its external surface contacting with the surface of the support. Thus it is externally sustained. The space within the can is free, and the balls as they enter the can meet no obstructing body; the sides of the can alone serve to guide them. Suitable provision may be made for bringing cans singly to filling position on support 3. Provision of simplest form to that end is illustrated in the drawings. An incline 31 leads to the support 3, and upon the incline a succession of cans rests one upon another, so that as each can is filled and removed the next succeeding can of the succession banked on the incline will come to filling position on the support.

The chute 4 is adapted to guide a filled can as it is pushed endwise (from right to left, Fig. I), and to deliver it to the guide 5. The guide 5 receives the cans one by one. It may be of any convenient form, and is shown to be equipped with a tongue or spring plate 51, and between tongue 51 and guide 5 the can is brought to erect position upon the moving plate 52, by which it may be borne to the can-closing apparatus.

A pusher 6 is borne by an endless chain 61. This endless chain extends above and transversely of the conveyor 1. Its lower reach is the portion which bears the pusher when in action. It extends in direct course throughout all the extent of the trough 2, and throughout a sufficient portion of the extent of the support 3. It is so positioned that the pusher advances at proper interval above the base of trough 2 and of support 3 to engage a ball resting on the trough and, through the engaged ball, a can resting on the support.

In operation, the travelling chain advances in the direction indicated in Fig. I by an arrow. Fig. I shows a can C in position on support 3, and a trough 2 laden with a set of three balls in alignment with the can. The can is open-ended toward the trough. The pusher here is shown to be about to engage the ball on the right, and it will be understood that the pusher travels from right to left. In its advance, it first drives the line of balls in order into the can, and then, the balls engaging the can, pushes the filled can along the support until it topples from the support 3 to the chute 4. The can then slides down the chute, enters the guide and it is brought to position upon plate 52. Meanwile, the pusher 6 borne by chain 61 completes its cycle of travel and in due time meets a new alignment of balls in a new trough, for delivery into a can coming newly to position on support 3. For, with the removal of a filled can a new can advances from the supply on incline 31, to take its position on support 3. An attendant sees to it that there is an unfailing supply of cans on incline 31, all oriented, so that when they come to position on the support 3 they are open-mouthed toward the conveyor 1.

The sprocket chain 61 is shown to be driven from a shaft 62 and it will be understood that the rotation of this shaft may be coordinated with the travel of conveyor 1. The travel of conveyor 1, however, will understood to be minutely intermittent, advancing through the interval at which troughs 2 succeed one another, and then standing at rest. The pusher 6 advances through its operating reach, or at least from end to end of the trough, while the trough is at rest.

It is desirable to provide positive and intermittently acting means for holding the individual can securely to place on support 3, for in such a succession an occasional can may be so far distorted from its intended cylindrical shape, that the advancing ball instead of entering freely will bear upon the edge of the can and push it empty from the support. To such end I show a swinging clamping finger 7, operated intermittently through a connecting rod 8 from a cam 9 upon a shaft 10. The shaft 10 is driven in suitable manner, as through chain 11, in coordination with the travel of sprocket chain 61, to the end that, simultaneously with the advance of pusher 6 from right to left, Fig. I, to carry a set of three balls from a trough 2 into a waiting can, the finger 7 will descend upon the can and hold it firmly to support 3 until the progress of pusher 6 has carried the three balls into the can. Thereupon the finger will rise, and the further advance of the pusher will drive the filled can from right to left, until it topples from support 3 and slides down chute 4.

I claim as my invention:

1. In apparatus for canning tennis balls, a conveyor equipped with a transversely extending, open ended trough, a stationary can support arranged adjacent the conveyor and adapted externally to sustain a can resting upon it, in a position transverse to the direction of conveyor travel and open ended to the path of conveyor travel, and a pusher movable transversely of the conveyor through the open-ended trough and above the can support, and adapted in its travel first to push tennis balls from a trough of the conveyor to a waiting can, and then to push the filled can longitudinally in a direction away from the conveyor.

2. In apparatus for canning tennis balls a movable conveyor equipped with a transversely extending open-ended ball-receiving trough, a can support arranged adjacent the conveyor and adapted to support an open-ended can in position for alignment with it of the conveyor-borne trough, a member movable transversely of said conveyor and adapted in the range of its movement first to push a can charge of balls from the conveyor trough to an aligned can resting on said support and in its further movement to push the charged can from the said support, and an intermittently acting clamp co-ordinated in its action with the said movable member and effective during the first portion of the described movement of the said member to hold a can at rest on the said support and ineffective during the further movement of the said member.

3. In apparatus for canning tennis balls a movable conveyor equipped with a transversely extending open-ended ball-receiving trough, a can support arranged adjacent the conveyor and adapted to support a can in a position for alignment with it of the trough borne by the said conveyor, an endless carrier movable in a path adjacent to and transversely disposed with respect to that of a can charge of balls borne in the trough by the said conveyor, and a finger borne by the said carrier and in the range of movement of the said carrier adapted to sweep first through the conveyor-borne trough and then across the adjacent can support.

In testimony whereof I have hereunto set my hand.

LEE R. HURLBURT.